United States Patent
Hu et al.

(10) Patent No.: US 7,540,643 B2
(45) Date of Patent: Jun. 2, 2009

(54) BACKLIGHT MODULES

(75) Inventors: Chih-Jen Hu, Hsinchu (TW); Yung-Lun Lin, Wujie Township, Yilan County (TW); Chih-Ming Chang, Jhongli (TW)

(73) Assignee: Au Optronics Corp., Hsinchu (TW)

( * ) Notice: Subject to any disclaimer, the term of this patent is extended or adjusted under 35 U.S.C. 154(b) by 173 days.

(21) Appl. No.: 11/146,753

(22) Filed: Jun. 7, 2005

(65) Prior Publication Data
US 2006/0181895 A1 Aug. 17, 2006

(30) Foreign Application Priority Data
Feb. 17, 2005 (TW) .............................. 94104608 A

(51) Int. Cl.
*G02B 6/00* (2006.01)
(52) U.S. Cl. ......................................... 362/551; 349/15
(58) Field of Classification Search ................. 362/551, 362/29, 559, 561, 227; 349/68, 15, 61
See application file for complete search history.

(56) References Cited
U.S. PATENT DOCUMENTS
5,608,422 A * 3/1997 Ikeda ......................... 345/101

| 5,945,965 | A | * | 8/1999 | Inoguchi et al. ................. 345/6 |
| 6,388,388 | B1 | | 5/2002 | Weindorf et al. .......... 315/169.3 |
| 7,234,854 | B2 | * | 6/2007 | Masamoto ................... 362/612 |
| 2003/0164815 | A1 | | 9/2003 | Nagatani |
| 2004/0246697 | A1 | * | 12/2004 | Yamashita et al. ............. 362/31 |
| 2005/0226003 | A1 | * | 10/2005 | Hung et al. .................. 362/613 |

FOREIGN PATENT DOCUMENTS
CN 1564068 1/2005
JP 2003257693 9/2003

OTHER PUBLICATIONS
China Office Action mailed Nov. 10, 2006.
English Abstract of JP2003257693.

* cited by examiner

*Primary Examiner*—Briggitte Hammond
*Assistant Examiner*—Vanessa Girardi
(74) *Attorney, Agent, or Firm*—Thomas, Kayden, Horstemeyer & Risley

(57) ABSTRACT

A backlight module for a display panel of a display device is provided. The backlight module comprises a light-emitting unit and a control unit. The light-emitting unit provides light to the display panel. When the display panel displays images in a first mode, the control unit drives the light-emitting unit to emit light of a first total brightness. When the display panel displays images in a second mode, the control unit drives the light-emitting unit to emit light of a second total brightness.

5 Claims, 8 Drawing Sheets

BACKLIGHT MODULES

BACKGROUND

The invention relates to a backlight module, and in particular to a backlight module employed in a 2-D/3-D display device.

Currently, some display devices provide both 2-D and 3-D display capabilities. FIG. 1 shows a conventional 2-D/3-D display device. The display device 1 comprises a display panel 10, a 2-D/3-D switching panel 11, and a backlight module 12. The backlight module 12 provides light of equal brightness in both 2-D and 3-D display modes.

Referring to FIG. 2, when the display panel 10 displays an image with a 2-D display mode, the 2-D/3-D switching panel 11 is a totally pervious area TA, so that, light from the backlight module 12 can be fully transmitted to the display panel 10. Both eyes of a user see the same image, and the image is recombined and is perceived as a flat image in user's brain. The flat image is called a 2-D image.

Referring FIG. 3, when the display panel 10 displays an image in 3-D display mode, the 2-D/3-D switching panel 11 comprises a plurality of black areas BA with a barrier and a plurality of pervious areas TA. The black areas BA of the 2-D/3-D switching panel 11 block part of the light emitted from the backlight module 12. The right and left eyes of a user see different images due the linearity of light. In FIG. 3, "R" represents the image on the display panel 10 seen by the right eye watches, and "L" represents the image on the display panel 10 seen by the left eye watches. The different images seen by the right and left eyes are recombined and perceived as a 3-D image.

Since the black areas BA of the 2-D/3-D switching panel 11 block part of light from the backlight module 12 when the display panel 10 displays an image in a 3-D display mode, light received by the display panel 10 is reduced. Compared with a 2-D display mode, a 3-D image is darker than a 2-D image. Thus, when the display device 10 is switched from 2-D display mode to 3-D display mode, the image brightness changes.

SUMMARY

Backlight modules are provided. Some embodiments of the backlight module comprise a light-emitting unit and a control unit. The light-emitting unit provides light to the display panel. The control unit is coupled to the light-emitting unit. When the display panel displays images in a first mode, the control unit drives the light-emitting unit to emit light with a first total brightness. When the display panel displays images with a second mode, the control unit drives the light-emitting unit to emit light with a second total brightness.

Some embodiments of the backlight module are employed in a display panel of a display device and comprise first and second light-emitting elements. The display panel comprises first and second display areas. The first light-emitting element corresponds to the first display area, while the second light-emitting element corresponds to the second display area. The first/second light-emitting element emits light of a first brightness when the first/second display area displays images in a first display mode and emits light with a second brightness when the first/second display area displays images in a second display mode.

DESCRIPTION OF THE DRAWINGS

The invention can be more fully understood by reading the subsequent detailed description and examples with references made to the accompanying drawings, wherein.

DETAILED DESCRIPTION

Figure 1:
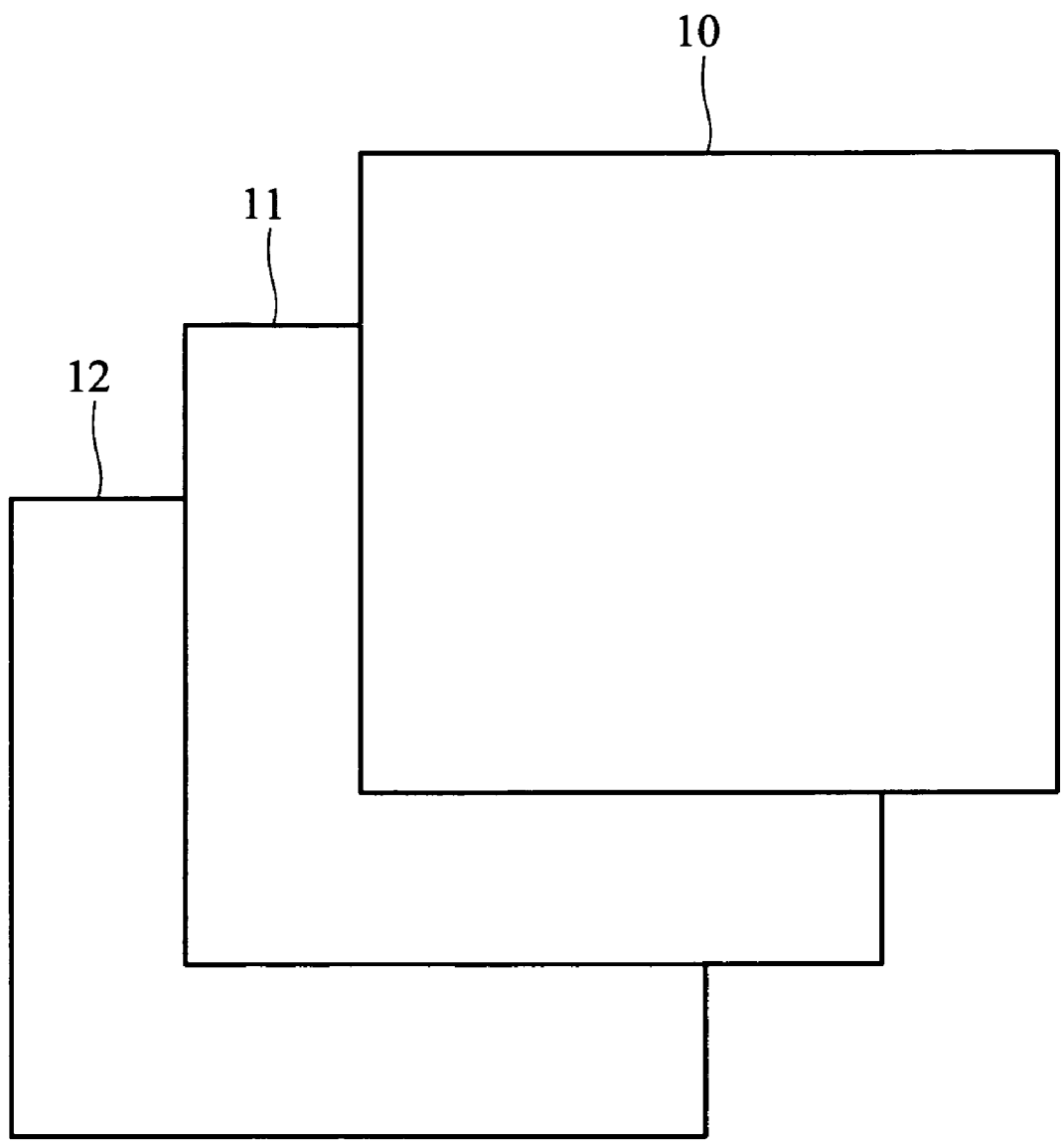
FIG. 1 shows a conventional 2-D/3-D display device.
Figure 2:
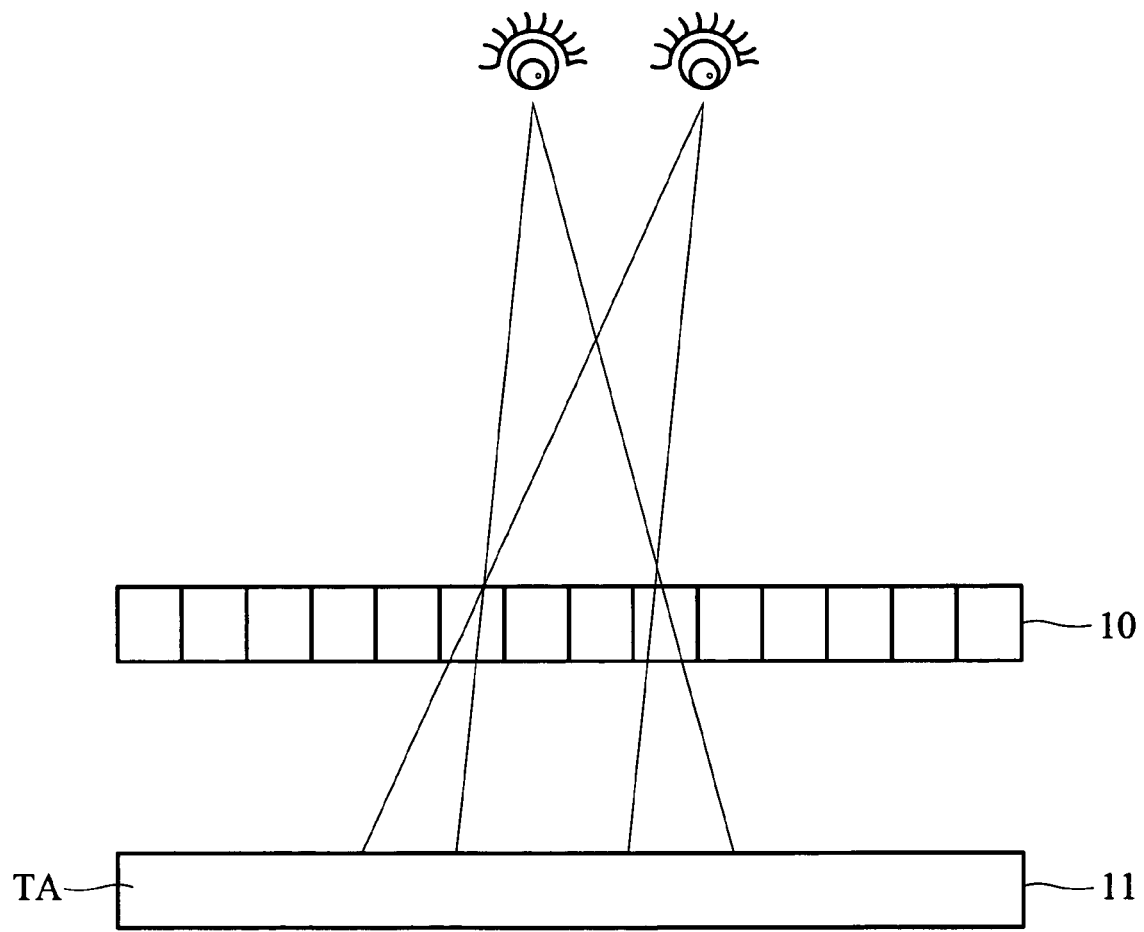
FIG. 2 is diagram of a display device displaying a 2-D image.
Figure 3:
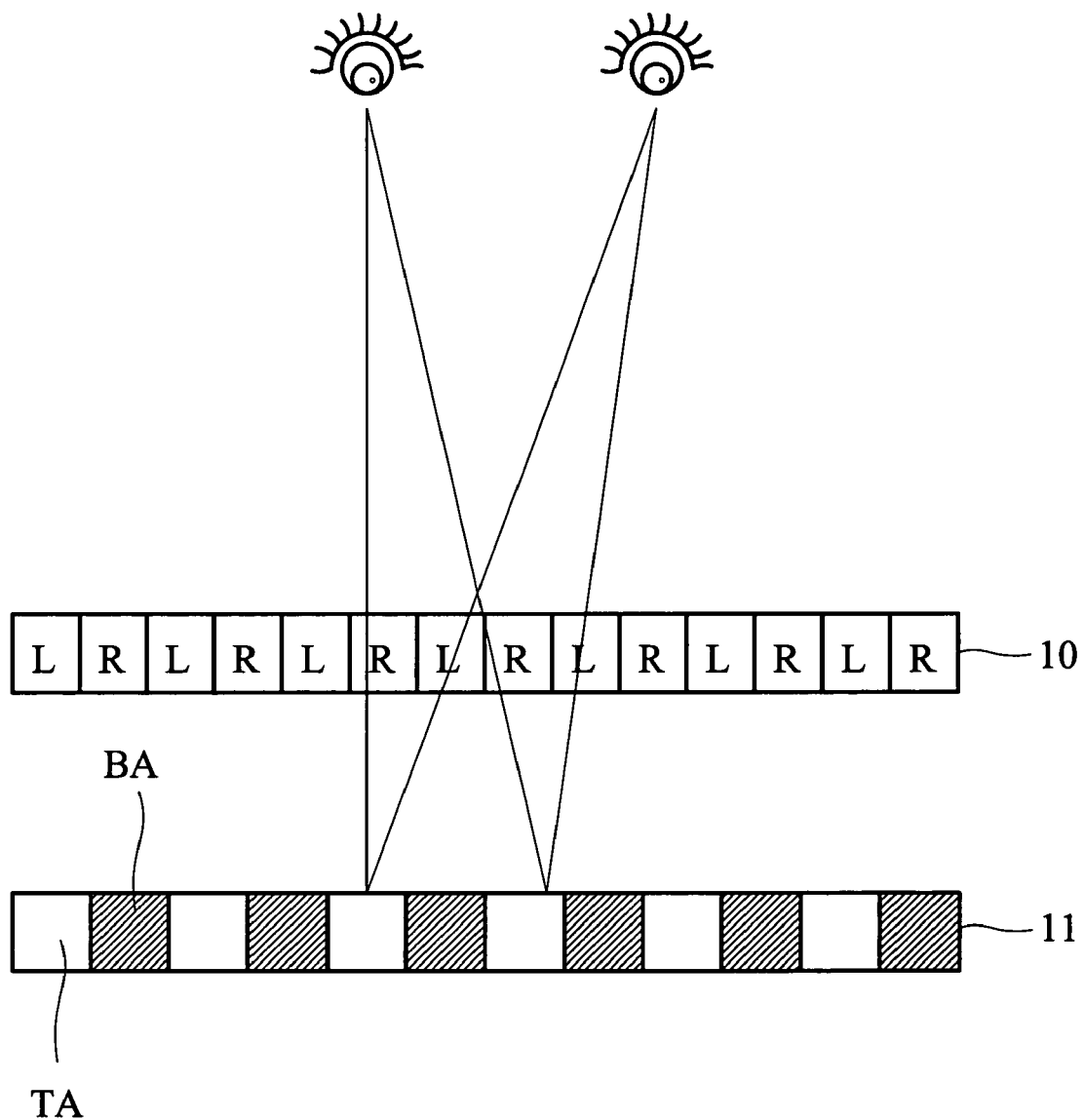
FIG. 3 is diagram of a display device displaying a 3-D image.
Figure 4:
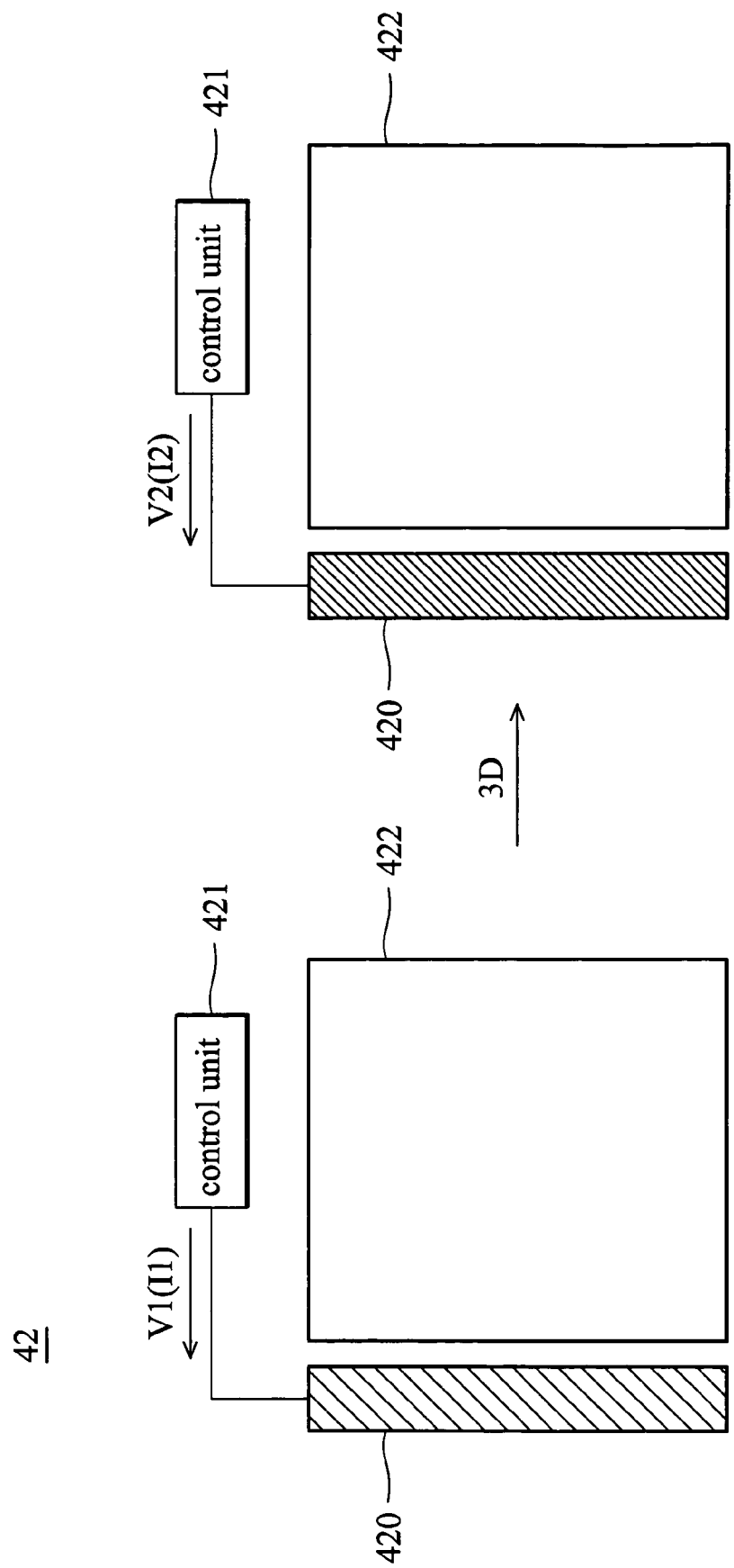
FIG. 4 shows an embodiment of a backlight module according to the present invention.

Backlight modules are provided. In an exemplary embodiment of a backlight module, as shown in FIG. 4, a backlight module 42 comprises a light-emitting unit 420, a control unit 421, and a light guide 422. The backlight module 42 can be applied in the display device of FIG. 1, in other words, the backlight module 42 replaces the backlight module 12 of FIG. 1. In FIG. 4, the backlight module 42 is a side-edge backlight module.

The light-emitting unit 420 is disposed on one side of the light guide 422 and provides light to the 2-D/3-D switching panel 11 through the light guide 422. When the display panel 10 displays an image in 2-D display mode, the control unit 421 drives the light-emitting unit 420 with a voltage V1, and the light-emitting unit 420 provides light of a first total brightness. When the display panel 10 displays an image in 3-D display mode, the control unit 421 drives the light-emitting unit 420 with a voltage V2 greater than voltage V1, and the light-emitting unit 420 provides light of a second total brightness. Since the voltage V2 is greater than the voltage V1 for the light-emitting unit 420, the second total brightness in 3-D display mode is greater than the first total brightness in 2-D display mode.

It is assumed that the light-emitting unit 420 is a current-driving device. When the display panel 10 displays an image in 2-D display mode, the control unit 421 drives the light-emitting unit 420 by a current I1. When the display panel 10 displays an image in 3-D display mode, the control unit 421 drives the light-emitting unit 420 by a current I2 larger than the current I1. Since the current I2 is greater than the current I1, for the light-emitting unit 420, the second total brightness in 3-D display mode is greater than the first total brightness in 2-D display mode.

As previously described, although the black areas BA of the 2-D/3-D switching panel 11 block part of the light emitted from the backlight module 42 when the display panel 10 displays an image in 3-D display mode, the light provided by the backlight module 42 is brighter, thereby compensating for the blocked light.

Figure 5:
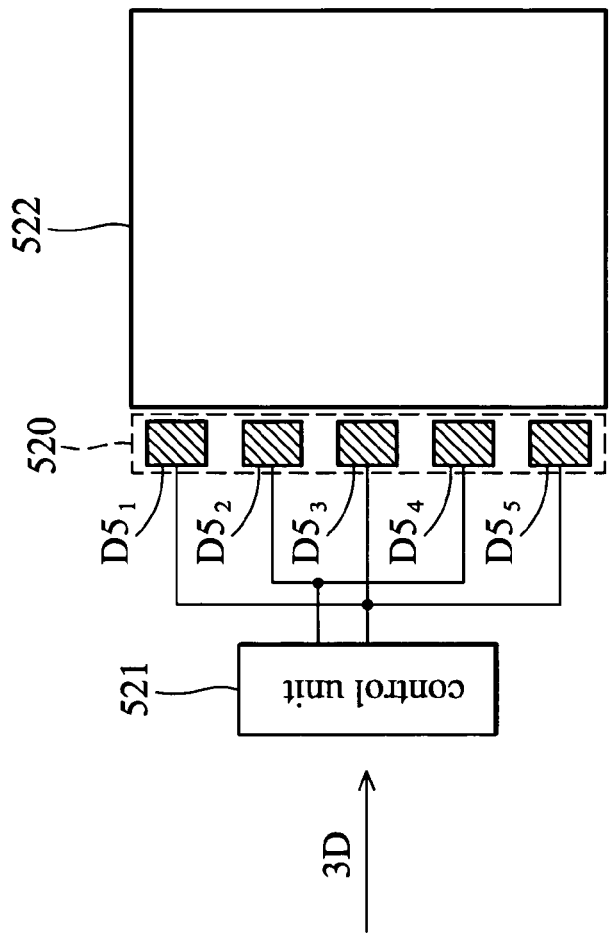
FIG. 5 shows an embodiment of a backlight module according to the present invention.
Figure 5:
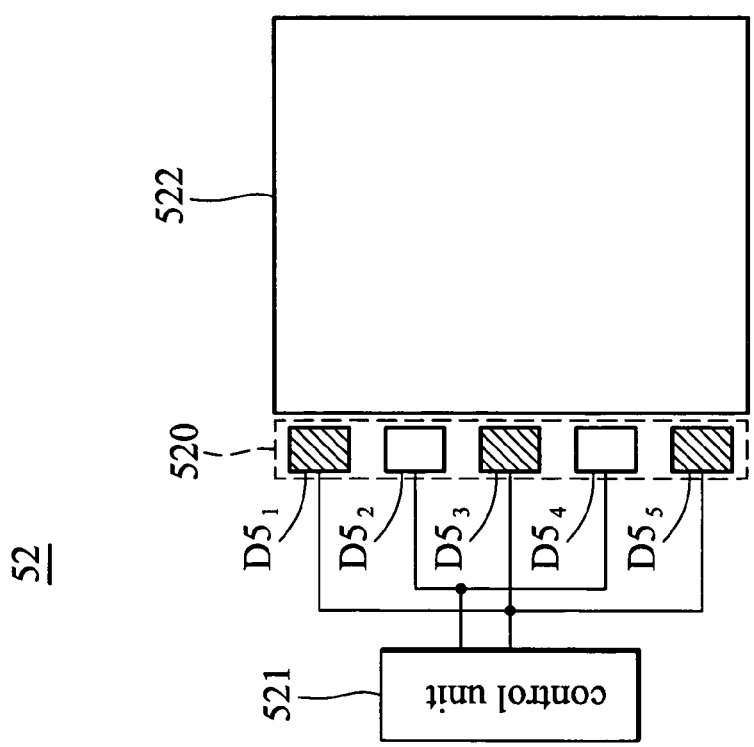

In some embodiments, as shown in FIG. 5, a backlight module 52 comprises a light-emitting unit 520, a control unit 521, and a light guide 522. The backlight module 52 can be applied in the display device of FIG. 1, in other words, the backlight module 52 replaces the backlight module 12 of FIG. 1. In the embodiment of FIG. 5, the backlight module 52 is a side-edge backlight module.

The light-emitting unit 520 is disposed on one side of the light guide 522 and provides light to the 2-D/3-D switching panel 11 through the light guide 522. The light-emitting unit 520 comprises a plurality of light-emitting elements $D5_1$ to $D5_5$ driven by the control unit 521. When the display panel 10 displays an image in 2-D display mode, the control unit 521 drives a portions of the light-emitting elements, such as light-emitting elements $D5_1$, $D5_3$, and $D5_5$. The light-emitting elements $D5_1$, $D5_3$, and $D5_5$ emit light together, and the light-emitting unit 520 provides light of a first total brightness. When the display panel 10 displays an image in 3-D display mode, the control unit 521 drives all the light-emitting elements $D5_1$ to $D5_5$. The light-emitting elements $D5_1$ to $D5_5$ emit light together, and the light-emitting unit 520 provides light of a second total brightness.

As previously described, although the black areas BA of the 2-D/3-D switching panel 11 block part of light from the backlight module 52 when the display panel 10 displays an image in 3-D display mode, the light provided by the backlight module 52 is brighter, thereby compensating for the blocked light.

In the embodiment of FIG. 5, the number of light-emitting elements driven in 3-D display mode is determined according to system requirements, without limitation. According to the embodiment of FIG. 5, the light blocked by the black areas BA of the 2-D/3-D switching panel 11 will be compensated for, as long as the number of light-emitting elements driven in 3-D display mode is greater than in 2-D display mode.

Figure 6:
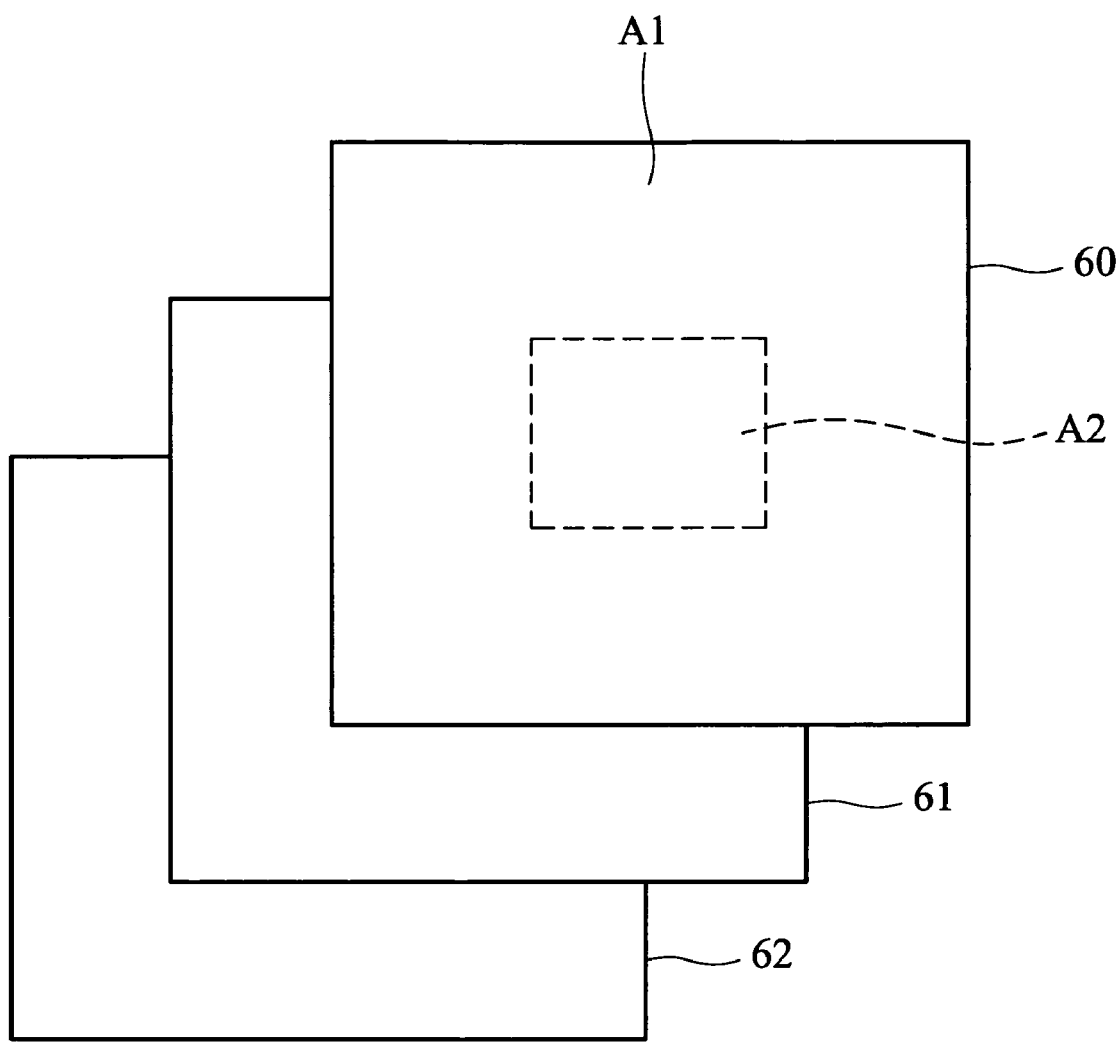
FIG. 6 shows an embodiment of a display device according to the present invention.

Display devices are provided. An exemplary embodiment of a display device 6, as shown in FIG. 6, comprises a display panel 60, a 2-D/3-D switching panel 61, and a backlight module 62. The display panel 60 is divided into display areas A1 and A2, and has three display modes.

Figure 7A:
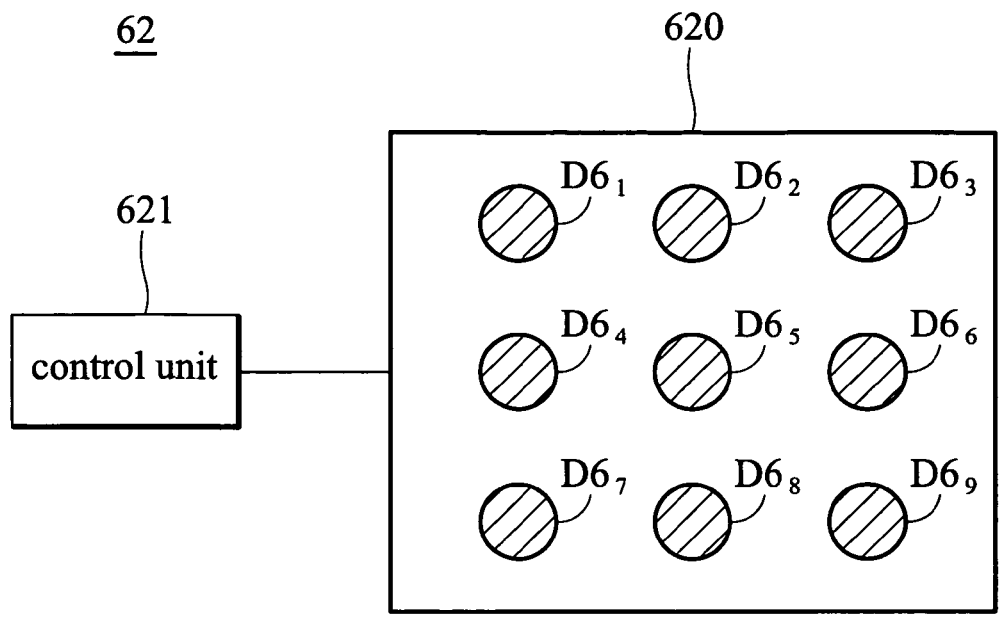
FIGS. 7A to 7C shows an embodiment of a backlight module of the display device in FIG. 6.
Figure 7B:
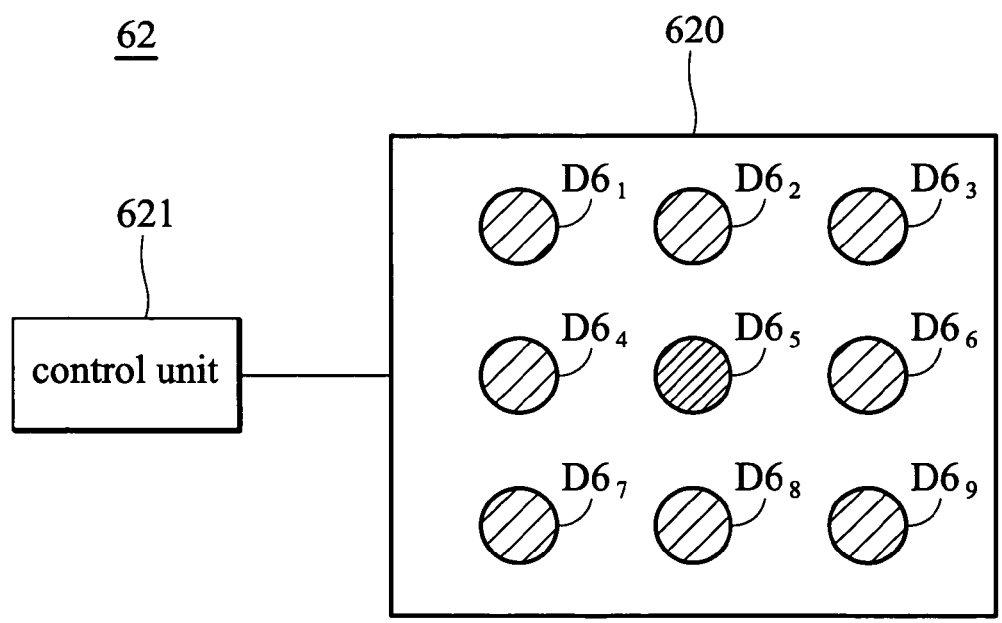
Figure 7C:
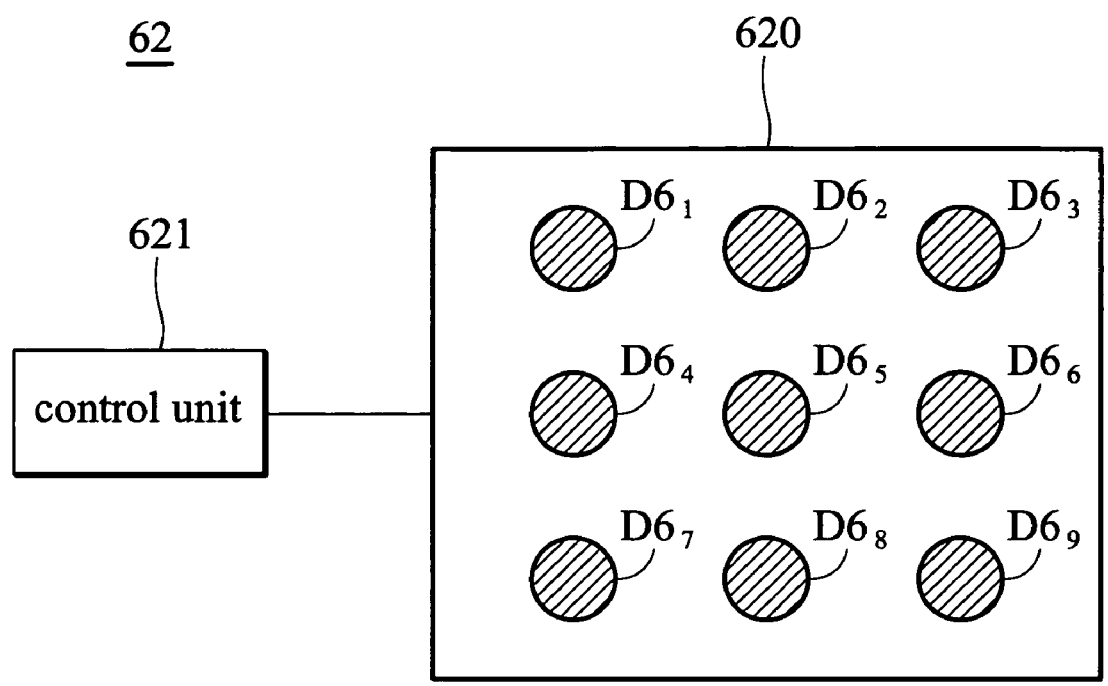

FIGS. 7A to 7C show an embodiment of backlight module 62 of FIG. 6. The backlight module 62 is a direct type backlight module and comprises a light-emitting unit 620 and a control unit 621. Referring to FIGS. 7A to 7C, the light-emitting unit 620 provides light to the 2-D/3-D switching panel 61 directly and comprises a plurality of light-emitting elements $D6_1$ to $D6_9$ driven by the control unit 621. The light-emitting elements $D6_1$ to $D6_4$ and $D6_6$ to $D6_9$ correspond to the display area A1, while light-emitting elements $D6_5$ corresponds to the display area A2.

Referring FIG. 7A, when the display panel 60 operates in a first mode, both display areas A1 and A2 display images in 2-D display mode. The control unit 621 drives the light-emitting elements $D6_1$ to $D6_9$ with a first voltage. Each of the light-emitting elements $D6_1$ to $D6_9$ emits light of first brightness. At this time, the total brightness of light-emitting elements $D6_1$ to $D6_9$ is equal to a first total brightness, that is, the light-emitting unit 620 provides light of the first total brightness.

Referring FIG. 7B, when the display panel 60 operates in a second mode, the display areas A1 and A2 display images in 2-D display mode and 3-D display mode respectively. The control unit 621 drives the light-emitting elements $D6_1$ to $D6_4$ and $D6_6$ to $D6_9$ with the first voltage, and each of the light-emitting elements $D6_1$ to $D6_4$ and $D6_6$ to $D6_9$ emits light of the first brightness. The control unit 621 drives the light-emitting element $D6_5$ with a second voltage larger than the first voltage, and the light-emitting element $D6_5$ emits light of second brightness greater than the first brightness. At this time, the total brightness of the light-emitting elements $D6_1$ to $D6_9$ is equal to a second total brightness, that is, the light-emitting unit 620 provides light of the second total brightness.

Referring FIG. 7C, when the display panel 60 operates according to a third mode, both display areas A1 and A2 display images in 3-D display mode. The control unit 621 drives the light-emitting elements $D6_1$ to $D6_9$ with the first voltage. Each of the light-emitting elements $D6_1$ to $D6_9$ emits light of the second brightness. At this time, the total brightness of the light-emitting elements $D6_1$ to $D6_9$ is equal to a third total brightness, that is, the light-emitting unit 620 provides light of the third total brightness. Accordingly, the third total brightness is greater than the second total brightness, while the second total brightness is greater than the first total brightness.

In the embodiment of FIGS. 7A to 7C, the light-emitting elements $D6_1$ to $D6_9$ can be current-driving devices. That is, the control unit 621 can drive the light-emitting elements $D6_1$ to $D6_9$ with currents. A light-emitting element driven by a smaller current emits light of a smaller brightness, while a light-emitting element driven by a greater current emits light of a greater brightness.

According to this embodiment, when the area of the display panel 60 displaying 3-D images is larger, the light-emitting unit 620 provides brighter light. Thus, the light blocked by the black areas BA of the 2-D/3-D switching panel 61 can be compensated for.

In some embodiments, if a display panel of a display device has both 2-D and 3-D display modes, a backlight module thereof can provide light of different brightness according to the display modes. When the entire or a portion of the display panel displays images in 3-D display mode, the backlight module provides light with greater brightness to the display panel. Accordingly, in 3-D display mode, although a 2-D/3-D switching panel blocks part of the light emitted by the backlight module, brightness received by the display panel is not reduced.

Finally, while the invention has been described by way of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A backlight module, for a display panel comprising:
   a first display area;
   a light guide;
   a light-emitting unit disposed on one lateral side of the light guide providing light to the display panel comprises a plurality of first light-emitting elements and a plurality of second light-emitting elements disposed in an alternating manner; and
   a control unit coupled to the light-emitting unit;
   wherein, when the display panel displays images in a 2-D mode, the control unit drives the first light-emitting elements to emit light to the first display area resulting in a first total brightness;
   wherein, when the display panel displays images in a 3-D mode, the control unit drives the first light-emitting elements and a second number of the second light-emitting elements to emit light to the display panel resulting in a second total brightness; and
   wherein, the second total brightness in the display panel is greater than the first total brightness in the display panel.

2. The backlight module as claimed in claim 1
   wherein, when the display panel displays images in the 2-D mode, the control unit drives the light-emitting unit with a first voltage; and
   wherein, when the display panel displays images in the 3-D mode, the control unit drives the light-emitting unit with a second voltage greater than the first voltage.

3. The backlight module as claimed in claim 1
wherein, when the display panel displays images in the 2-D mode, the control unit drives the light-emitting unit with a first current; and
wherein, when the display panel displays images in the 3-D mode, the control unit drives the light-emitting unit with a second current greater than the first current.

4. The backlight module as claimed in claim 1, wherein each of the second light-emitting elements is adjacent to and between two of the first light-emitting elements.

5. The backlight module as claimed in claim 1, wherein each of the first light-emitting elements is adjacent to and between two of the second light-emitting elements.

* * * * *